United States Patent
Limpert et al.

(10) Patent No.: US 8,760,753 B2
(45) Date of Patent: Jun. 24, 2014

(54) DEVICE FOR AMPLIFYING LIGHT IMPULSES

(75) Inventors: Jens Limpert, Jena (DE); Enrico Seise, Tautenhain (DE); Damian Schimpf, Cambridge, MA (US); Fabian Roeser, Dresden (DE); Andreas Tuennermann, Weimar (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 211 days.

(21) Appl. No.: 13/138,070

(22) PCT Filed: Dec. 23, 2009

(86) PCT No.: PCT/EP2009/009247
§ 371 (c)(1),
(2), (4) Date: Oct. 28, 2011

(87) PCT Pub. No.: WO2010/075999
PCT Pub. Date: Jul. 8, 2010

(65) Prior Publication Data
US 2012/0050843 A1    Mar. 1, 2012

(30) Foreign Application Priority Data
Dec. 30, 2008    (DE) .......................... 10 2008 063 368

(51) Int. Cl.
*H01S 3/10*    (2006.01)
*H01S 4/00*    (2006.01)

(52) U.S. Cl.
USPC ........................................... 359/333; 372/25

(58) Field of Classification Search
USPC ............................................ 372/25; 359/333
See application file for complete search history.

(56) References Cited

U.S. PATENT DOCUMENTS

| | | | |
|---|---|---|---|
| 8,064,489 B2 * | 11/2011 | Falcoz | 372/13 |
| 2004/0000942 A1 | 1/2004 | Kapteyn et al. | |
| 2005/0105865 A1 * | 5/2005 | Fermann et al. | 385/122 |
| 2006/0221449 A1 * | 10/2006 | Glebov et al. | 359/575 |
| 2009/0002808 A1 * | 1/2009 | Wise et al. | 359/337.1 |

FOREIGN PATENT DOCUMENTS

WO    WO 2006/057655    6/2006

OTHER PUBLICATIONS

International Search Report of PCT/EP2009/009247, Mar. 29, 2010.

(Continued)

*Primary Examiner* — Eric Bolda
(74) *Attorney, Agent, or Firm* — Collard & Roe, P.C.

(57) ABSTRACT

The present invention relates to a device (12) and to a method for amplifying light impulses (13). The device comprises a stretcher (15) stretching the light impulses over time, at least one amplifier (16) amplifying the stretched light impulses, and a compressor (17) compressing the stretched and amplified light impulses, wherein the amplifier (16) applies a non-linear phase generated by self-phase modulation to the stretched light impulses. In order to provide a device and a method for amplifying light impulses, by means of which light impulses having higher light impulse quality and light impulse peak power can be generated, the invention proposes that means for spectrally shaping the light impulses are disposed ahead of the amplifier (16) in the beam path, wherein the means for spectrally shaping the light impulses bring about a spectral trimming of the light impulses.

11 Claims, 3 Drawing Sheets

(56) References Cited

OTHER PUBLICATIONS

Figure 1:
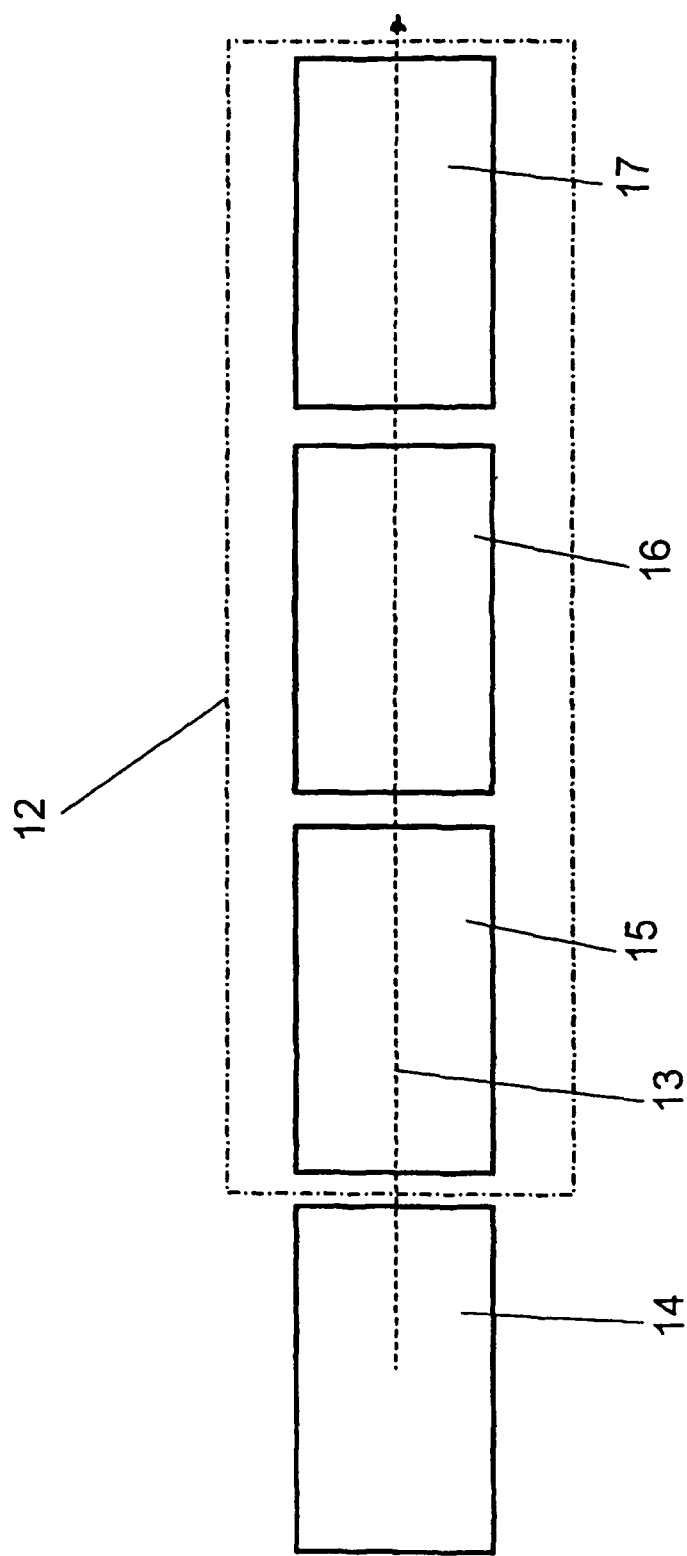

Seise E. et al., "Peak-power scaling induced by spectral clipping in nonlinear CPA-systems," Jun. 14, 2009, Lasers and Electro-Optics 2009 and the European Quantum Electronics Conference, CLEO Europe—EQEC 2009, IEEE, Piscataway, NJ, USA, p. 1, XP031501957, (ISR).

Ursescu, D. et al., "Spectrally clipped pulses analysis in a CPA laser system," University 'Politehnica' of Bucharest Scientific Bulletin, Series A: Applied Mathematics and Physics, vol. 70, No. 4, Jan. 1, 2008, pp. 49-56, XP009130696, (ISR).

Schimpf, D. N. et al., "Controlling the influence of SPM in fiber-based chirped-pulse amplification systems by using an actively shaped parabolic spectrum," Optics Express Optical Society of America, USA, vol. 15, No. 25, Dec. 4, 2007, pp. 16945-16953, XP002572769, (ISR).

Kimihisha Ohno et al., "Adaptive pulse shaping of phase and amplitude of an amplified femtosecond pulse laser by direct reference to frequency-resolved optical gating traces," Journal of the Optical Society of America B (Optical Physics) Opt. Soc. America USA, vol. 19, No. 11, Nov. 2002, pp. 2781-2790, XP002572770, (ISR).

\* cited by examiner

DEVICE FOR AMPLIFYING LIGHT IMPULSES

CROSS REFERENCE TO RELATED APPLICATIONS

This application is the National Stage of PCT/EP2009/009247 filed on Dec. 23, 2009, which claims priority under 35 U.S.C. §119 of German Application No. 10 2008 063 368.2 filed on Dec. 30, 2008, the disclosure of which is incorporated by reference. The international application under PCT article 21(2) was not published in English.

The invention relates to a device for amplifying light pulses, having a stretcher that temporally stretches the light pulses, at least one amplifier that amplifies the stretched light pulses, and a compressor that recompresses the stretched and amplified light pulses, whereby the amplifier imprints a non-linear phase generated by means of self-phase modulation onto the stretched light pulses. Furthermore, the invention relates to a method for amplifying light pulses.

Such devices are known and find use, for example, in the production of high-energy laser pulses. In this connection, ultra-short light pulses that have a pulse duration in the range of picoseconds or femtoseconds are amplified all the way into the petawatt range.

In order to avoid damage to optical elements as well as limitations by means of non-linear effects, the ultra-short light pulses are first passed through a stretcher that temporally stretches the light pulses, by means of dispersion. In this connection, the light pulses are given a longer pulse duration and a lesser amplitude. The temporally stretched light pulses are subsequently amplified by means of an amplifier, for example an optically pumped amplifier fiber, without the possibility of damage to the optical elements of the amplifier or of undesirable non-linearities. The temporally stretched and amplified light pulses are subsequently recompressed by means of a compressor, again by means of dispersion. In this connection, the light pulses are given the desired high intensity and short pulse duration.

The previously described amplification principle is also called chirp-modulated pulse amplification (CPA—chirped pulse amplification). In CPA systems, it is known to imprint a positive chirp on the initial ultra-short light pulse by means of a stretcher that is configured as an element of normal dispersion. This is compensated after amplification, analogously, by means of the compressor, which is configured as an element of abnormal dispersion. Conventional elements for generating the positive chirp are, for example, grating stretchers (e.g. of the Öffner type), but also chirped fiber gratings or chirped volume gratings, whereby the positive chirp is compensated after amplification of the light pulses, by means of a grating compressor consisting of a suitable pair of gratings.

It is disadvantageous in connection with such CPA systems that despite the temporal stretching of the light pulses and the related reduced pulse peak power, the influence of the self-phase modulation (SPM) occurs in the amplifier with increasing extracted pulse energy, as a disruptive non-linear effect of the lowest order. Fiber-based amplifiers are particularly susceptible to this effect because of their geometry. The non-linear phase that is imprinted by means of self-phase modulation can be represented as follows:

$$d\phi_{SPM}(z,T) = \gamma |A(z,T)|^2 dz$$

where $\gamma$ stands for a non-linear parameter, A stands for the temporal light pulse amplitude, and z stands for the propagation distance of the light pulse through the amplifier. This non-linear phase possesses components that have non-parabolic phase terms, for conventional light pulse shapes, such as, for example, a secant hyperbolic light pulse shape. These cannot be compensated by the chirp of the compressor, which is linear in the first order, and this leads to deterioration of the compressed light pulse quality and to a reduction in the light pulse peak power after compression, respectively. The so-called B integral is used as a measure of the imprinted non-linear phase; this is defined as the integration of the maximal non-linear phase generated by means of self-phase modulation at the peak of the pulse, over the propagation distance:

$$B = \frac{2\pi}{\lambda_z} \int_0^L n_2 I(z) dz$$

where I(z) represents the locally dependent light pulse peak intensity, $n_2$ represents the linear refraction index, and $\lambda_z$ represents the central wavelength of the light pulses. A reduction in the light pulse peak power and a deterioration of the light pulse quality can be recognized with an increasing value of the B integral. In this connection, a distinction is made between linear amplification at B<rad $\pi$ and non-linear amplification at B>rad $\pi$.

A known approach for circumventing the problems of deterioration of pulse quality with increasing non-linearity is pulse shaping.

It is known that the spectral amplitude can be transferred into the temporal range by means of a sufficiently large chirp, i.e. by means of sufficiently great stretching of the light pulses, in other words, spectral shaping corresponds to temporal shaping in a CPA system. For example, parabolic pulses can be amplified. This light pulse shape is immune, in a first approximation, to non-linear phase components imprinted by means of self-phase modulation. This means that proceeding from a parabolic light pulse shape, the non-linear phase produced by means of self-phase modulation again leads only to a parabolic phase shape, which corresponds to a linear chirp. This can be completely compensated by means of the dispersive elements of the stretcher and compressor arrangement in the CPA system.

It is the task of the present invention to make available a device and a corresponding method, respectively, for amplifying light pulses, which are improved as compared with the state of the art, and prevent deterioration of the light pulse quality and a reduction in the effective light pulse peak power, with an increasing value of the B integral.

This task is accomplished, according to the invention, proceeding from a device of the type stated initially, in that means for spectral shaping of the light pulses are provided in the beam path ahead of the amplifier, whereby the means for spectral shaping of the light pulses bring about spectral trimming of the light pulses.

According to the invention, deterioration of the light pulse quality and a reduction in the effective light pulse peak power can be clearly reduced, at a rising non-linear phase generated by means of self-phase modulation, by means of spectral trimming of the light pulses already in the beam path ahead of the amplifier.

The invention is based on the recognition that a spectrally trimmed light pulse is tolerant, to a great extent, with regard to the non-linear phase generated by means of self-phase modulation, with regard to amplification by means of a CPA system. According to the invention, spectral trimming ensures that essentially those components of the light pulse are amplified whose non-linear phase is dominated by parabolic components.

Spectral trimming in the sense of the invention particularly means sharp trimming (English "hard cut"). This can be predetermined by the optical arrangement, in targeted manner, for example, with a grating arrangement used as a stretcher. For this purpose, a grating arrangement can be selected, for example, which covers a specific spectral bandwidth on the basis of its dimensioning (i.e. the regions of the spectrum that are not covered are sharply cut off), and, at the same time, generates maximal stretching for the covered spectral range, i.e. the temporal stretching that is maximally possible on the basis of the dimensioning of the grating arrangement.

According to an advantageous embodiment of the invention, spectral trimming of the light pulses takes place in such a manner that the trimmed light pulses have a symmetrical pulse shape, to a great extent, in the time domain. Specifically, if dispersion of a higher order plays a role in the CPA system (for example when using highly dispersive gratings as stretchers), this can lead to asymmetry of the stretched light pulses. Then care should be taken to ensure (for example by means of asymmetrical spectral trimming of the light pulses) that the stretched light pulses have a more or less symmetrical pulse shape in the time domain. In this way, it is ensured that the non-linear phase of the light pulses after amplification is again dominated by parabolic components (which can be compensated), in the sense of the invention.

According to another advantageous embodiment of the invention, the stretcher is configured as a grating stretcher, the refraction gratings of which form the means for spectral shaping of the light pulses. According to this embodiment, no additional components are required in the CPA system, which actually has a conventional configuration, but rather the functionality according to the invention is implemented by means of suitable selection or configuration of the refraction grating of the stretcher. This can take place, in the simplest case, by means of suitable dimensioning of the refraction gratings, namely in such a manner that the undesired parts of the spectrum of the light pulses are cut off. In general, in the sense of the invention, the optical components of the stretcher arrangement can be designed, in targeted manner, in such a manner that they bring about the desired spectral trimming.

Another advantageous embodiment of the invention provides that the stretcher is designed in such a manner that it maximally temporally stretches the spectrally shaped light pulses. In this way, light pulses having very great amplitudes or light pulse peak power values can be amplified using the device according to the invention, specifically without any deterioration of the light pulse quality or light pulse peak power of the recompressed light pulses as the result of non-linearities. The maximal stretching factor of the stretcher is determined (in the case of a grating stretcher) by the size of the gratings (in the direction transverse to the crosspieces of the gratings). For example, in the case of a grating stretcher, the optical arrangement can always be adapted in such a manner that the grating in question precisely covers the desired spectral range and generates the corresponding maximal stretching. This means that according to the invention, the possibility arises of stretching the bandwidth of the light pulse that is optimal or necessary for a specific B integral more greatly (as compared to the case without trimming), and thus being able to extract a higher light pulse energy at a given B integral.

It is furthermore proposed that the value of the B integral of the amplifier is $> \pi$ rad ($=180°$). This means that according to this embodiment, the amplifier is a non-linear amplifier, in targeted manner.

It is advantageous if the value of the B integral lies between $\pi$ rad ($=180°$) and $2\pi$ rad ($=360°$), whereby the spectral shaping of the light pulses takes place in such a manner that the spectral width of the recompressed light pulses is trimmed to 1.0 to 2.0 times the full width at half maximum (FWHM) of the untrimmed light pulses. This parameterization brings about the result that a clear increase in the achievable light pulse peak power comes about.

An advantageous embodiment of the invention, as an alternative to this, provides that the value of the B integral is $>2\pi$ rad ($=360°$), whereby the spectral shaping of the light pulses takes place in such a manner that the spectral width of the recompressed light pulses is trimmed to 0.75 to 1.5 times the full width at half maximum of the untrimmed light pulses. In this value range, the light pulse peak power generated with the device can be brought to an optimum.

At a B integral value of 10 rad, for example, 1.1 times the light pulse peak power as compared to the case without trimming, at which the spectral width of the recompressed light pulses amounts to 4 times the full width at half maximum of the untrimmed light pulses, is already achieved with trimming of the spectral width of the recompressed light pulses to 1.25 times the full width at half maximum of the untrimmed light pulses. However, with trimming to 1.25 times the full width at half maximum, it is possible to stretch the light pulses more greatly by more than 3 times, at identical grating dimensions, and accordingly, to extract more than 3 times the energy, in order to again imprint a non-linear phase having a B integral value of 10 rad, which allows an increase in the light pulse peak power by a factor $>3$.

According to the invention, the following situation is to be aimed at: At a given required amplification factor, the spectral characteristic of the amplifier is known and can depend on the central wavelength of the light pulses. Accordingly, a spectral distribution at the output of the amplifier is set, which has the width of the amplifier characteristic including gain narrowing or a lesser bandwidth as its bandwidth. The extensively sharp-edged spectral trimming is supposed to be produced by means of one of the elements ahead of the main amplifier, for example in the stretcher, preferably the corresponding grating, in order to allow a maximal stretching factor.

Explicitly, stretched rectangular pulses, in other words light pulses having a rectangular spectral shape, are supposed to be excluded. Disadvantages of this light pulse shape are the poorer light pulse quality and light pulse peak power in comparison with a Gauss spectrum, $sech^2$-shaped spectrum, or a similar spectrum, the greater susceptibility for spectral shaping or deformation, in accordance with the amplifier characteristic and/or by means of saturation effects, as well as the greater demands on the spectral width of the seed source. In the sense of the invention, it is proposed, instead, that the light pulses have a parabolic pulse shape, a $sech^2$ pulse shape, or a Gauss pulse shape. These pulse shapes are immune to self-phase modulation, to the greatest possible extent, and bring a high light pulse peak power and light pulse quality with them.

To accomplish the above task, further a method for amplifying light pulses is proposed, whereby light pulses are temporally stretched by means of a stretcher, the stretched light pulses are amplified by means of at least one amplifier, whereby a non-linear phase generated by means of self-phase modulation is imprinted onto the stretched light pulses, and the stretched and amplified light pulses are recompressed by means of a compressor.

According to the invention, the light pulses are spectrally shaped in the stretcher or after the stretcher and ahead of the amplifier, whereby the spectral shaping is spectral trimming of the light pulses. This leads to the advantages as compared with the state of the art that were mentioned above, in connection with the device.

Figure 2A:
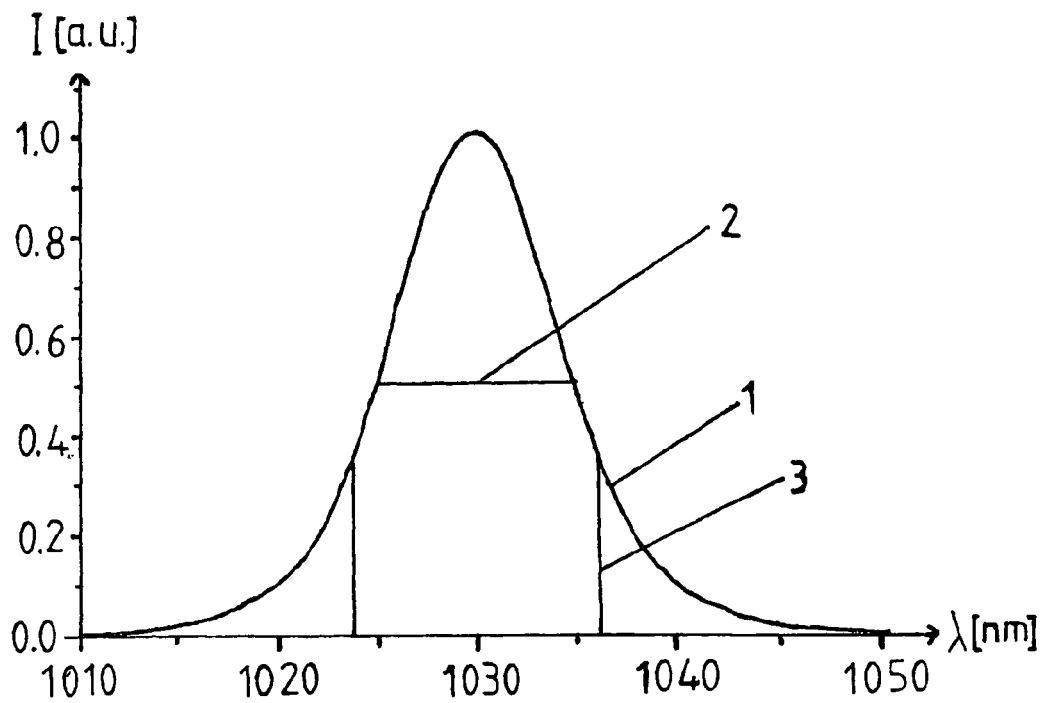
Figure 2B:
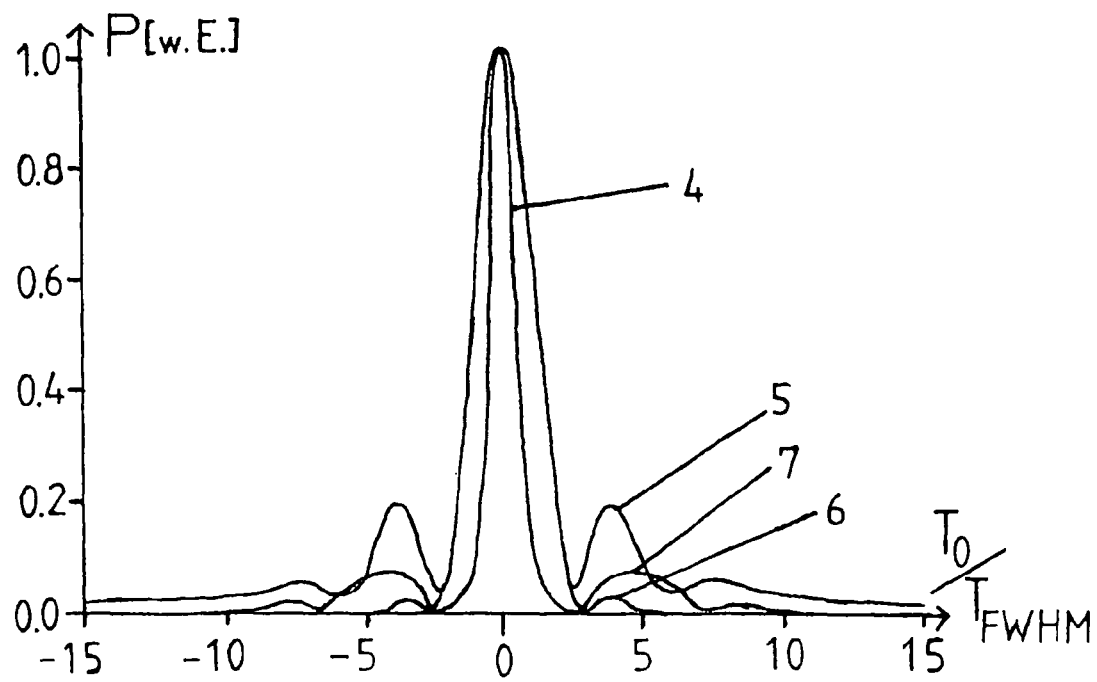
Figure 3A:
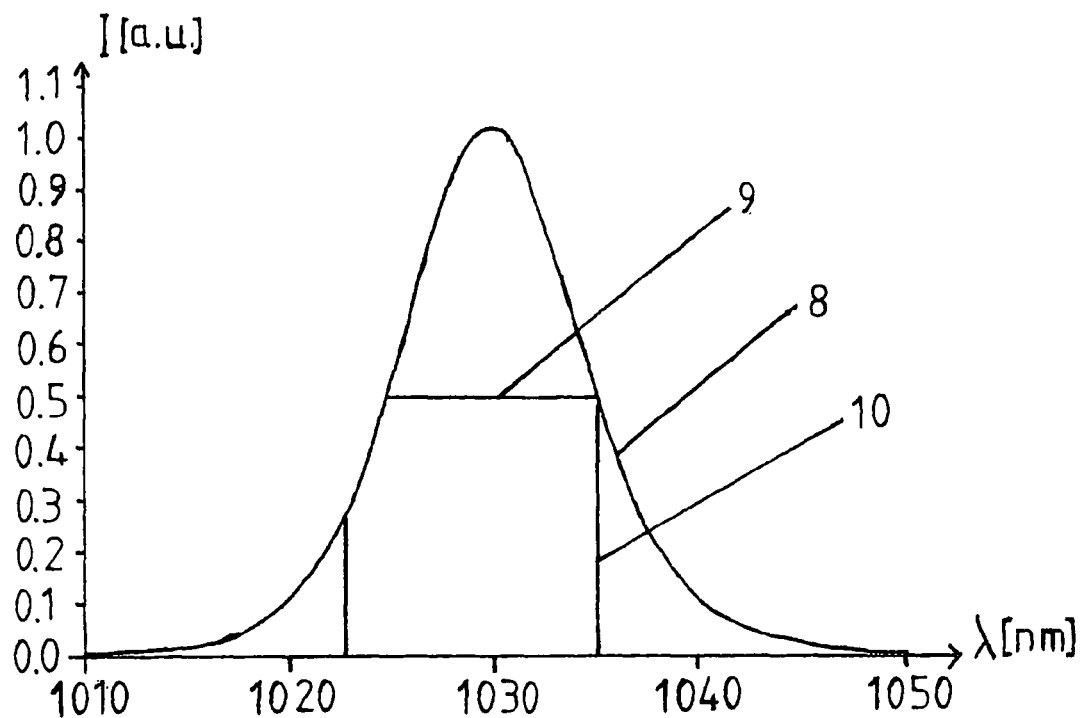
Figure 3B:
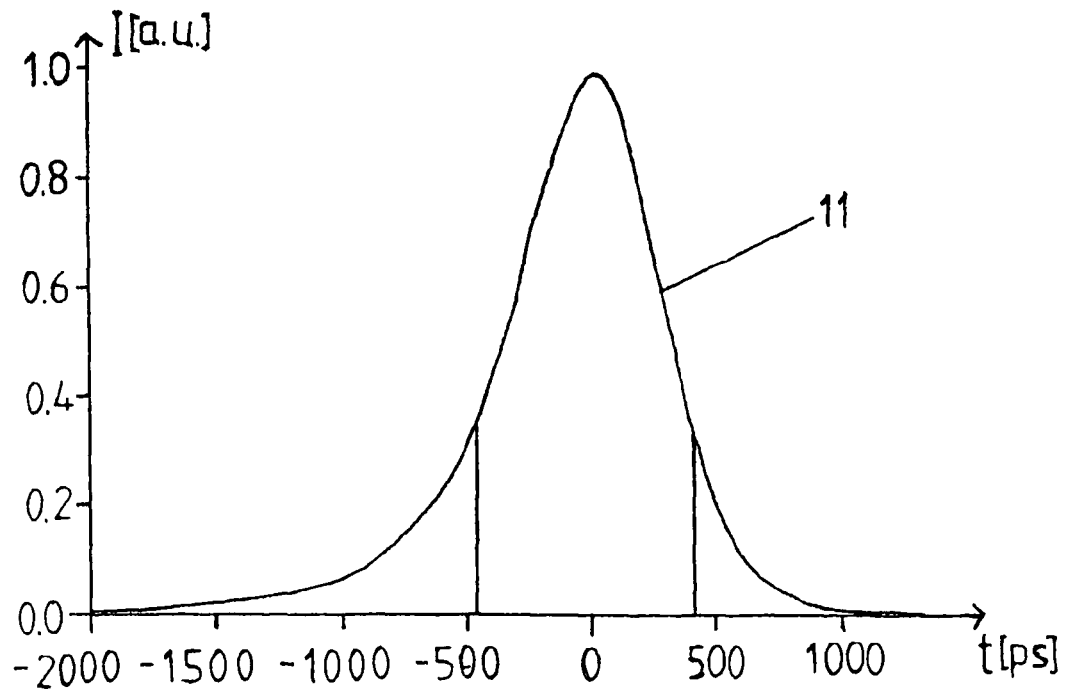

Further advantages and characteristics of the present invention will be explained in the following, using the exemplary embodiments shown in the figures. These show:

FIG. 1: a schematic representation of an exemplary embodiment of the device according to the invention, FIG. 2a: an example of spectral trimming of a light pulse, FIG. 2b: effects of the trimming shown in FIG. 2a, FIG. 3a: an example of asymmetrical spectral trimming of a light pulse, and FIG. 3b: the effects of the trimming of FIG. 3a in the time domain.

FIG. 1 shows an embodiment of the device 12, according to the invention, for amplifying light pulses 13. The light pulses 13 are generated by a short-pulse source 14, for example a short-pulse oscillator or an already amplified short-pulse oscillator, and subsequently temporally stretched by means of the stretcher 15. Subsequent to the temporal stretching of the light pulses 13, amplification of same takes place by means of the at least one amplifier 16 or, alternatively, by means of multiple amplifiers 16 in the form of an amplifier chain. After amplification of the light pulses 13, they are temporally recompressed by means of the compressor 17, so that in the final analysis, short light pulses of high intensity are made available.

The structure shown as a whole in FIG. 1 essentially corresponds to a CPA system. In this CPA system or the embodiment of the device 12 according to the invention, as shown, spectral trimming of the light pulses takes place by means of a grating of the stretcher 15, which is configured as a grating stretcher, in order to compensate the non-linear phase generated by means of self-phase modulation in the amplifier 16. No additional components are required, so that as a whole, the device 12 has a very simple and compact structure.

FIG. 2a shows symmetrical spectral trimming of a light pulse 1 that has a full width at half maximum 2 (FWHM) of 10 nm, as an example. The spectral width of the trimmed light pulse 3 amounts to 1.25 times the full width at half maximum 2, in other words it amounts to 12.5 nm. The spectral intensity I is plotted over the wavelength $\lambda$.

FIG. 2b shows the effects of trimming according to FIG. 2a in a non-linear CPA system. The temporal intensity profiles (standardized power P) of the recompressed light pulses are plotted over the standardized time $T_0/T_{FWHM}$. In the entire CPA system, only dispersion of the $2^{nd}$ order is considered (GVD). Higher orders play a subordinate role. The transform-limited intensity profile 4 is generated without any trimming of the light pulse 1 shown in FIG. 1 and a B integral value of 0, in other words at linear amplification. Intensity profile 5 is also generated without any trimming of the light pulse 1, whereby the value of the B integral is $3\pi$, however, which means non-linear amplification of the light pulse 1. Greater secondary maxima can be seen, which were caused by the disruptive non-linear phase generated by means of self-phase modulation. Furthermore, widening of the central peak as compared with the intensity profile 4 is caused by the non-linear phase. Reference symbol 6 refers to an intensity profile generated by means of trimming of the light pulse 1, whereby the trimming takes place in such a manner that the spectral width of the trimmed light pulse is 1.25 times as great as the full width at half maximum 2 of the light pulse 1. The value of the B integral is 0, so that linear amplification of the light pulse 1 takes place. This intensity profile 6 corresponds to the intensity profile 4, with the exception of the small secondary maxima. Reference symbol 7 refers to an intensity profile that is generated with the same trimming as in the previous case, but at a B integral value of $3\pi$ rad, in other words with non-linear amplification of the light pulse 1. The secondary maxima of the intensity profile 7 are clearly lower than in the case of the intensity profile 5, and this is brought about by means of the trimming, according to the invention, of the light pulse 1 at non-linear amplification. For the remainder, there is no significant difference as compared with the previous case with linear amplification. This means that a spectrally trimmed light pulse is tolerant, to a great extent, with regard to the non-linear phase generated by means of self-phase modulation. This is due to the fact that the spectral components of the light pulse 1, which possess a great deviation from parabolic components of the spectral phase in untrimmed light pulses 1, no longer have a power content as the result of the trimming.

FIG. 3a shows an example of asymmetrical spectral trimming of a light pulse 8. A $sech^2$ light pulse 8 having a spectral bandwidth 9 of 10 nm at a central wavelength of 1030 nm is shown. This light pulse 8 is stretched with phases $\phi_2=40.2 \text{ ps}^2$ and $\phi_3=1.226 \text{ ps}^3$, corresponding to a Littrow configuration of a 1840 l/mm grating and an effective grating spacing of 0.2 m. The asymmetry of the stretched light pulse 8 can be clearly seen. If this light pulse 8 is asymmetrically spectrally trimmed, as is supposed to be indicated with the lines referred to with the reference symbol 10, an essentially symmetrically trimmed, stretched light pulse 11 is obtained in the time domain, as it is shown as an example in FIG. 3b.

The invention claimed is:

1. Device for amplifying light pulses, having a stretcher (15) that temporally stretches the light pulses (13), at least one amplifier (16) that amplifies the stretched light pulses, and a compressor (17) that recompresses the stretched and amplified light pulses, wherein the amplifier (16) imprints a non-linear phase generated by means of self-phase modulation onto the stretched light pulses, wherein the stretcher is a grating stretcher having refraction gratings that perform spectral shaping of the light pulses, disposed in the beam path ahead of the amplifier (16), wherein the gratings bring about a sharp spectral trimming of the light pulses, wherein the spectral trimming of the light pulses takes place in such a manner that the trimmed light pulses have an essentially symmetrical pulse shape in the time domain.

2. Device according to claim 1, wherein the stretcher is configured as a chirped fiber grating or volume grating, the spectral properties of which bring about the spectral shaping of the light pulses.

3. Device according to claim 1, wherein the value of the B integral of the amplifier is $>\pi$ rad ($=180°$).

4. Device according to claim 3, wherein the value of the B integral lies between $\pi$ rad ($=180°$) and $2\pi$ rad ($=360°$), wherein the spectral shaping of the light pulses takes place in such a manner that the spectral width of the recompressed light pulses is trimmed to 1.0 to 2.0 times the full width at half maximum of the untrimmed light pulses.

5. Device according to claim 3, wherein the value of the B integral is greater than $2\pi$ rad ($=360°$), wherein the spectral shaping of the light pulses takes place in such a manner that the spectral width of the recompressed light pulses is trimmed to 0.75 to 1.5 times the full width at half maximum of the untrimmed light pulses.

6. Device according to claim 1, wherein the light pulses have a parabolic pulse shape, a $sech^2$ pulse shape, or a Gauss pulse shape.

7. Method for amplifying light pulses, wherein
light pulses are temporally stretched by means of a stretcher, the stretched light pulses are amplified by means of at least one amplifier, wherein a non-linear phase generated by means of self-phase modulation is imprinted onto the stretched light pulses, the stretched and amplified light pulses are recompressed by means of a compressor, wherein the light pulses are spectrally shaped in the stretcher or after the stretcher and ahead of the amplifier, wherein the spectral shaping is sharp spectral trimming of the light pulses, and wherein the spectral trimming of the light pulses takes place in such a manner that the trimmed light pulses have an essentially symmetrical pulse shape in the time domain.

8. Method according to claim 7, wherein the spectral shaping takes place by means of a refraction grating of the stretcher.

9. Method according to claim 7, wherein the value of the B integral of the amplifier lies between $\pi$ rad (=180°) and $2\pi$ rad (=360°), wherein the spectral shaping of the light pulses takes place in such a manner that the spectral width of the recompressed light pulses is trimmed to 1.0 to 2.0 times the full width at half maximum of the untrimmed light pulses.

10. Method according to claim 7, wherein the value of the B integral of the amplifier is greater than $2\pi$ rad (=360°), wherein the spectral shaping of the light pulses takes place in such a manner that the spectral width of the recompressed light pulses is trimmed to 0.75 to 1.5 times the full width at half maximum of the untrimmed light pulses.

11. Method according to claim 7, wherein light pulses having a parabolic pulse shape, a $\operatorname{sech}^2$ pulse shape, or a Gauss pulse shape are used.

* * * * *